United States Patent
Thomas et al.

(10) Patent No.: US 12,550,823 B2
(45) Date of Patent: Feb. 17, 2026

(54) AGRICULTURAL HEADER WITH A DRAPER BELT INCLUDING A SEED SAVER DISPOSED BEHIND ONE OR MORE CROP RAMPS

(71) Applicant: CNH Industrial America LLC, New Holland, PA (US)

(72) Inventors: Jeffrey D. Thomas, Gordonville, PA (US); Joel T. Cook, Lititz, PA (US)

(73) Assignee: CNH Industrial America LLC, New Holland, PA (US)

( * ) Notice: Subject to any disclaimer, the term of this patent is extended or adjusted under 35 U.S.C. 154(b) by 918 days.

(21) Appl. No.: 17/841,102

(22) Filed: Jun. 15, 2022

(65) Prior Publication Data

US 2023/0403978 A1    Dec. 21, 2023

(51) Int. Cl.
*A01D 61/00* (2006.01)
*A01D 61/02* (2006.01)

(52) U.S. Cl.
CPC ........... *A01D 61/002* (2013.01); *A01D 61/02* (2013.01)

(58) Field of Classification Search
CPC .... A01D 41/141; A01D 61/102; A01D 61/02; A01D 61/002
See application file for complete search history.

(56) References Cited

U.S. PATENT DOCUMENTS

| | | | |
|---|---|---|---|
| 6,351,931 B1 * | 3/2002 | Shearer | A01D 57/20 56/DIG. 17 |
| 8,191,344 B2 | 6/2012 | Sauerwein | |
| 8,205,421 B2 | 6/2012 | Sauerwein et al. | |
| 9,635,810 B2 * | 5/2017 | Leys | A01D 34/14 |
| 9,795,086 B2 | 10/2017 | Hasenour | |
| 9,814,183 B2 | 11/2017 | Allochis | |
| 10,813,290 B2 | 10/2020 | Modak et al. | |
| 2015/0195993 A1 * | 7/2015 | Hasenour | A01D 57/20 56/153 |
| 2019/0373815 A1 | 12/2019 | Modak et al. | |
| 2022/0007583 A1 | 1/2022 | Fernando Carvalho et al. | |

FOREIGN PATENT DOCUMENTS

| | | | |
|---|---|---|---|
| EP | 2111741 A1 * | 10/2009 | A01D 41/14 |
| EP | 3912452 A1 | 11/2021 | |

OTHER PUBLICATIONS

International Search Report and Written Opinion for PCT/US2023/025286 dated Oct. 10, 2023 (12 pages).

* cited by examiner

*Primary Examiner* — Joseph M Rocca
*Assistant Examiner* — Ashley A Kaercher
(74) *Attorney, Agent, or Firm* — CM Law PLLC; Stephen J. Weed

(57) ABSTRACT

A header for an agricultural harvester includes: a header frame; a plurality of cutters carried by the header frame and configured to sever crop material; a draper belt carried by the header frame rearwardly of the cutters and configured to travel in a travel direction; at least one crop ramp associated with at least one of the cutters, the at least one crop ramp including a front edge disposed in front of the draper belt and a rear edge that overlaps the draper belt; and a seed saver that is associated with the draper belt and defines a length extending in the travel direction. The seed saver extends above the draper belt and is disposed rearwardly of the rear edge of the at least one crop ramp.

14 Claims, 4 Drawing Sheets

AGRICULTURAL HEADER WITH A DRAPER BELT INCLUDING A SEED SAVER DISPOSED BEHIND ONE OR MORE CROP RAMPS

FIELD OF THE INVENTION

The present invention pertains to agricultural harvesters and, more specifically, to agricultural headers including a draper belt.

BACKGROUND OF THE INVENTION

An agricultural harvester known as a "combine" is historically termed such because it combines multiple harvesting functions with a single harvesting unit, such as picking, threshing, separating and cleaning. A combine includes a header which removes the crop from a field, and a feeder housing which transports the crop matter into a threshing rotor. The threshing rotor rotates within a perforated housing, which may be in the form of adjustable concaves and performs a threshing operation on the crop to remove the grain. Once the grain is threshed it falls through perforations in the concaves onto a grain pan. From the grain pan the grain is cleaned using a cleaning system, and is then transported to a grain tank onboard the combine. A cleaning fan blows air through the sieves to discharge chaff and other debris toward the rear of the combine. Non-grain crop material such as straw from the threshing section proceeds through a residue system, which may utilize a straw chopper to process the non-grain material and direct it out the rear of the combine. When the grain tank becomes full, the combine is positioned adjacent a vehicle into which the grain is to be unloaded, such as a semi-trailer, gravity box, straight truck, or the like; and an unloading system on the combine is actuated to transfer the grain into the vehicle.

To remove crop material from the field, the header of the combine harvester may be equipped with a cutter bar assembly having many sharp cutting elements that reciprocate sidewardly, relative to a forward direction of travel, to sever the crop material from the field before entering the feeder housing. The header may include a rotating reel with tines or the like to sweep crop material toward the cutting elements.

A conveyance system can be carried rearwardly of the cutting elements. Two different conveyance systems are widely used to transport cut crop material toward a center of the header before proceeding to the feeder housing. The first type of conveyance system utilizes a pair of cross augers which counter-rotate to convey crop material from sides of the header toward the center. The other type of conveyance system utilizes a rotating belt, which can be referred to as a draper belt, to convey material from sides of the header toward the center. When a draper belt is used to convey crop material toward the center of the header, the header can be referred to as a "draper header."

A draper header is typically used to harvest fluffy or bushy crop material such as soybeans or canola. Many draper headers include two lateral draper belts that convey the crop material longitudinally inward and a center feed belt that conveys the crop material into the feeder housing. Each draper belt may be wrapped around rollers, for example various combinations of drive rollers and idler rollers. The draper belts may include cleats extending transversely across the full width of the header, which contact the crop material to help facilitate its transportation into the feeder housing.

To help maximize the amount of crop material that is harvested, many headers with draper belts include one or more crop ramps associated with the cutting elements. After the crop material is severed by the cutting elements, the crop material travels along the crop ramp(s) onto the draper belt. Such a configuration is effective to increase the amount of crop material that makes it onto the draper belt, but there are still scenarios where crop material is lost and/or function of the header is impaired.

What is needed in the art is a way to decrease the amount of crop material that is lost during harvesting and/or reduce detrimental effects on operation of the header.

SUMMARY OF THE INVENTION

Exemplary embodiments provided according to the present disclosure include a seed saver that extends generally parallel to a travel direction of a draper belt and is disposed behind one or more crop ramps.

In some exemplary embodiments provided according to the present disclosure, a header for an agricultural harvester includes: a header frame; a plurality of cutters carried by the header frame and configured to sever crop material; a draper belt carried by the header frame rearwardly of the cutters and configured to travel in a travel direction; at least one crop ramp associated with at least one of the cutters, the at least one crop ramp including a front edge disposed in front of the draper belt and a rear edge that overlaps the draper belt; and a seed saver that is associated with the draper belt and defines a length extending in the travel direction. The seed saver extends above the draper belt and is disposed rearwardly of the rear edge of the at least one crop ramp.

In some exemplary embodiments provided according to the present disclosure, an agricultural harvester includes a chassis and a header carried by the chassis. The header includes: a header frame; a plurality of cutters carried by the header frame and configured to sever crop material; a draper belt carried by the header frame rearwardly of the cutters and configured to travel in a travel direction; at least one crop ramp associated with at least one of the cutters, the at least one crop ramp including a front edge disposed in front of the draper belt and a rear edge that overlaps the draper belt; and a seed saver that is associated with the draper belt and defines a length extending in the travel direction. The seed saver extends above the draper belt and is disposed rearwardly of the rear edge of the at least one crop ramp.

One possible advantage that may be realized by exemplary embodiments disclosed herein is that the seed saver prevents crop material from falling off the draper belt to increase crop material yield.

Another possible advantage that may be realized by exemplary embodiments disclosed herein is that the seed saver being disposed rearwardly of the rear edge of the crop ramp(s) reduces the risk of debris such as dirt, dust, etc. from accumulating between the crop ramp(s) and the draper belt and detrimentally affecting performance of the draper belt.

Yet another possible advantage that may be realized by exemplary embodiments disclosed herein is that the draper belt may carry one or more debris dislodging protrusions that can dislodge debris that has accumulated on the crop ramp(s).

BRIEF DESCRIPTION OF THE DRAWINGS

For the purpose of illustration, there are shown in the drawings certain embodiments of the present invention. It should be understood, however, that the invention is not limited to the precise arrangements, dimensions, and instruments shown. Like numerals indicate like elements throughout the drawings. In the drawings.

DETAILED DESCRIPTION OF THE INVENTION

Figure 1:
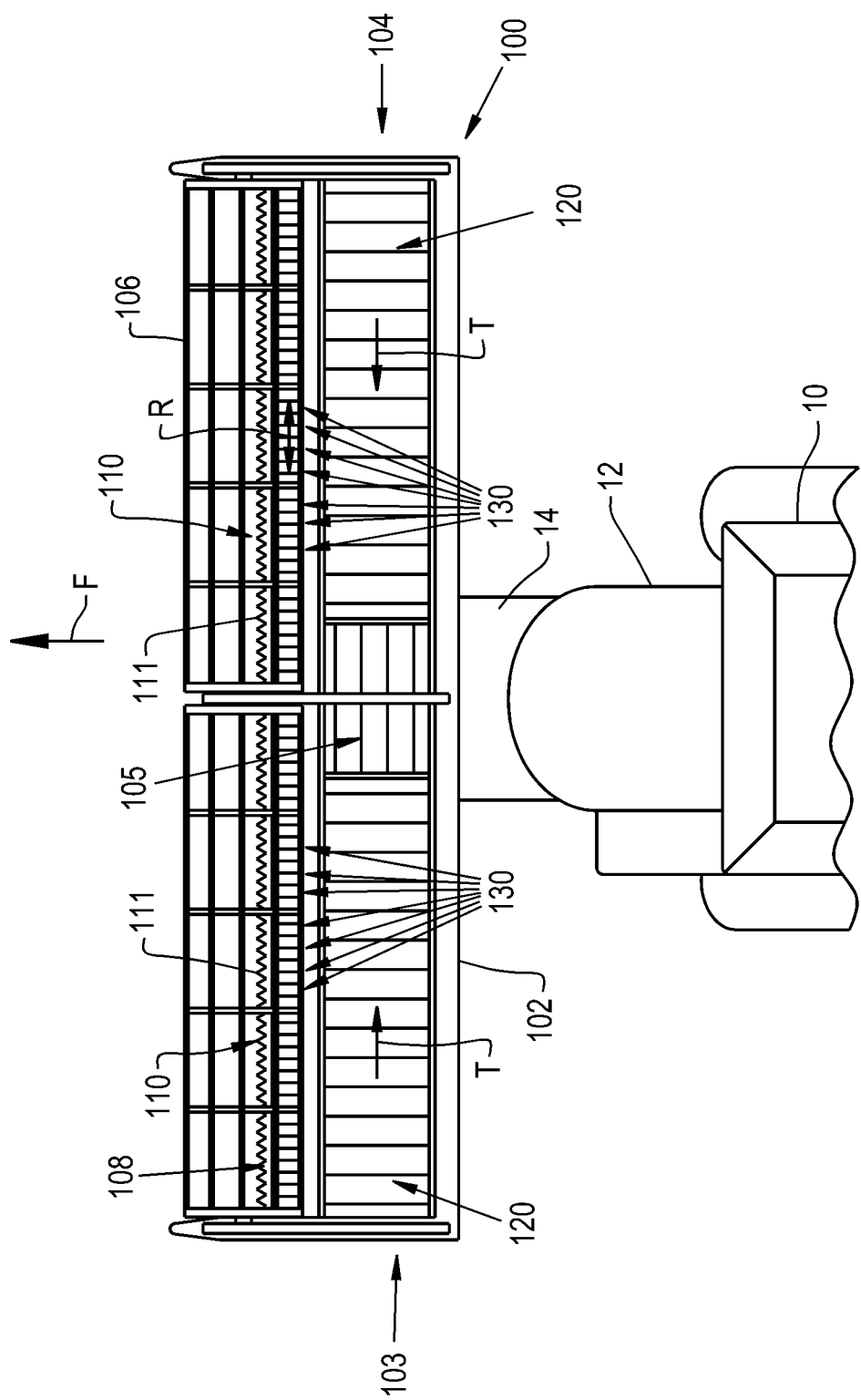
FIG. 1 illustrates a top view of an exemplary embodiment of an agricultural harvester including a header with a pair of draper belts, provided in accordance with an exemplary embodiment of the present invention.

Referring now to the drawings, and more particularly to FIG. 1, there is shown an exemplary embodiment of an agricultural vehicle 10 in the form of a combine harvester which generally includes a chassis 12, a feeder housing 14, and an attachment in the form of a header 100. Typically, the combine harvester 10 will include additional internal systems for the separation and handling of collected crop material, but these additional systems are omitted from view for brevity of description. It should be appreciated that the header 100 described and illustrated herein does not necessarily need to be included on combine harvesters, but can be incorporated in other agricultural vehicles such as windrowers.

The header 100 is coupled to, and therefore carried by, the chassis 12 of the agricultural vehicle 10 by, for example, coupling to the feeder housing 14. In the exemplary embodiment shown, the header 100 is in the form of a draper header 100 to harvest bushy or fluffy crop material. The draper header 100 has a header frame 102 coupled to the chassis 12 by coupling to the feeder housing 14 and a pair of opposed lateral ends 103, 104. The draper header 100 may support one or more flexible cutter bar assemblies 110 that include cutters 111 in the form of reciprocating knives 111 to cut crop material as the agricultural vehicle 10 travels in a forward direction, denoted by arrow F. The reciprocating knives 111 can be reciprocated back-and-forth in a lateral direction, denoted by arrow R, relative to the forward direction F in any known manner, e.g., by a wobble box, epicyclic drive, etc. The draper header 100 may further include a center feed belt 105 or a center auger that conveys the crop material into the feeder housing 14. The draper header 100 may also include one or more lateral, flexible draper belts 120 that are positioned rearwardly of the cutter bar assemblies 110 and cutters 111 and travel, i.e. rotate, in opposing travel directions, denoted by each arrow "T", in order to convey the crop material inwardly to the center feed belt 105 and thereby the feeder housing 14. The header 100 may also include a rotating reel 106 with tines or the like to sweep the crop material inwardly.

Figure 2:
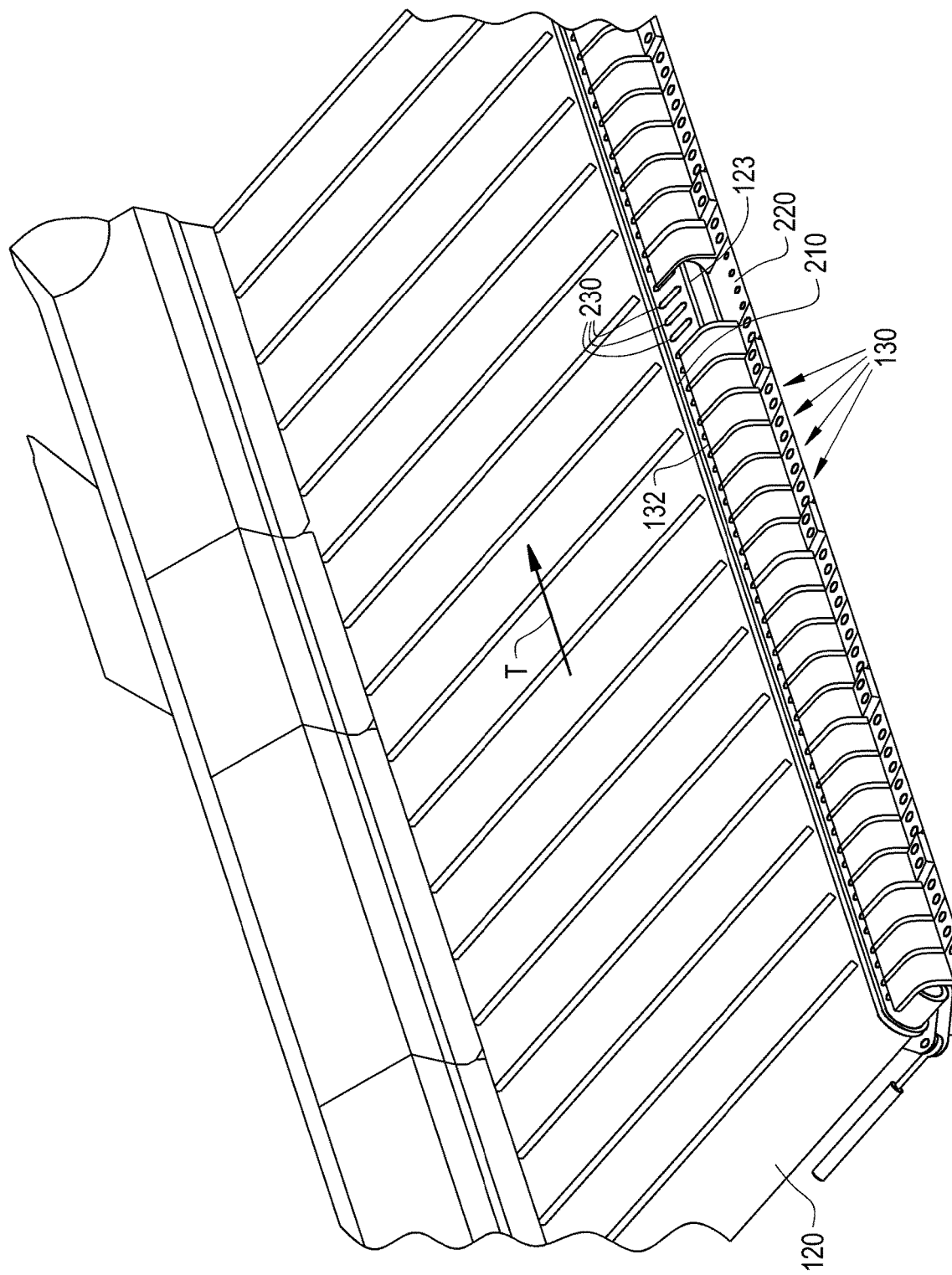
FIG. 2 illustrates a perspective view of the header of FIG. 1.
Figure 3:
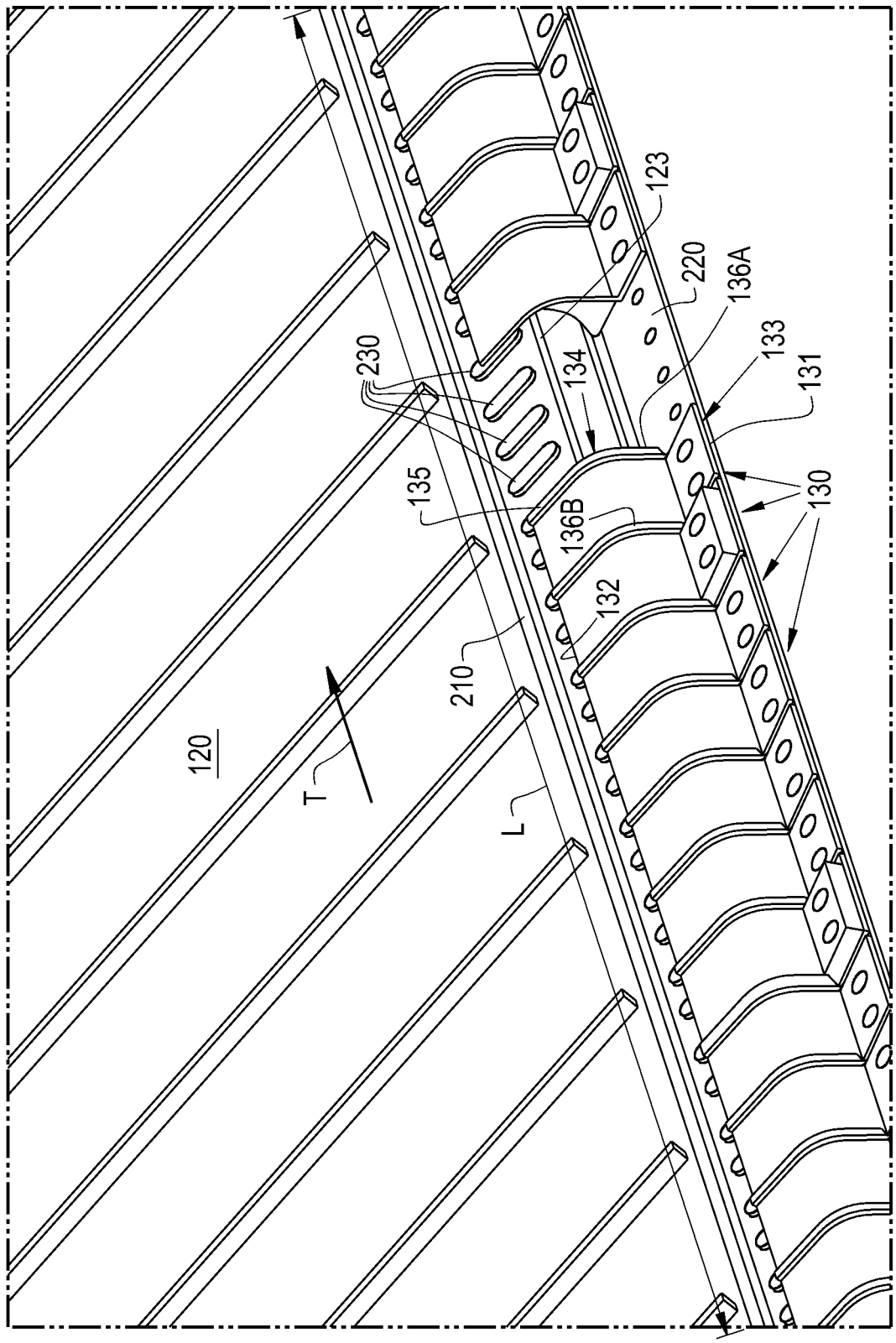
FIG. 3 illustrates another perspective view of the header of FIGS. 1-2.

The header 100 includes at least one crop ramp, illustrated as a plurality of crop ramps 130, that are each associated with one of the cutters 111. By associating the crop ramps 130 with one or more of the cutters 111, crop material severed by the cutters 111 flows along the crop ramps 130 and is directed onto the draper belts 120, reducing the amount of crop material lost after being cut. As illustrated in FIGS. 2-3, the crop ramps 130 each have a front edge 131 that is disposed in front of the draper belt 120 and a rear edge 132 that overlaps the draper belt 120. As used herein, "overlap" is considered in the vertical direction such that the rear edge 132 of the crop ramps 130 is above the draper belt 120. In some embodiments, the front edge 131 of each crop ramp 130 does not overlap the draper belt 120 (in the vertical direction). The crop ramps 130 may, for example, include a mounting section 133 that includes the front edge 131 and is coupled to a mounting bar 220 and a guiding section 134 that includes the rear edge 132 and is cantilevered to the mounting section 133. In some embodiments, the mounting section 133 is generally flat while the guiding section 134 defines a curved shape that follows one or more arcs. The curvature of the mounting section 133 may be adjusted to guide cut crop material onto the draper belt 120 in a desired fashion. While the guiding section 134 is illustrated as curved and following one or more arcs, in some embodiments the guiding section 134 defines a shape that includes one or more flat regions. Each of the guiding sections 134 may also include a respective lip 135 that extends along a lateral edge 136A of the crop ramp 130. An opposite lateral edge 136B of one or more of the crop ramps 130 may abut and/or fit in the lip 135 of an adjacent crop ramp 130. It should be appreciated that while the header 100 is illustrated with many individual crop ramps 130 that each have a separate mounting section 133 mounted to the mounting bar 220, in some embodiments only a single crop ramp 130 is provided.

Figure 4:
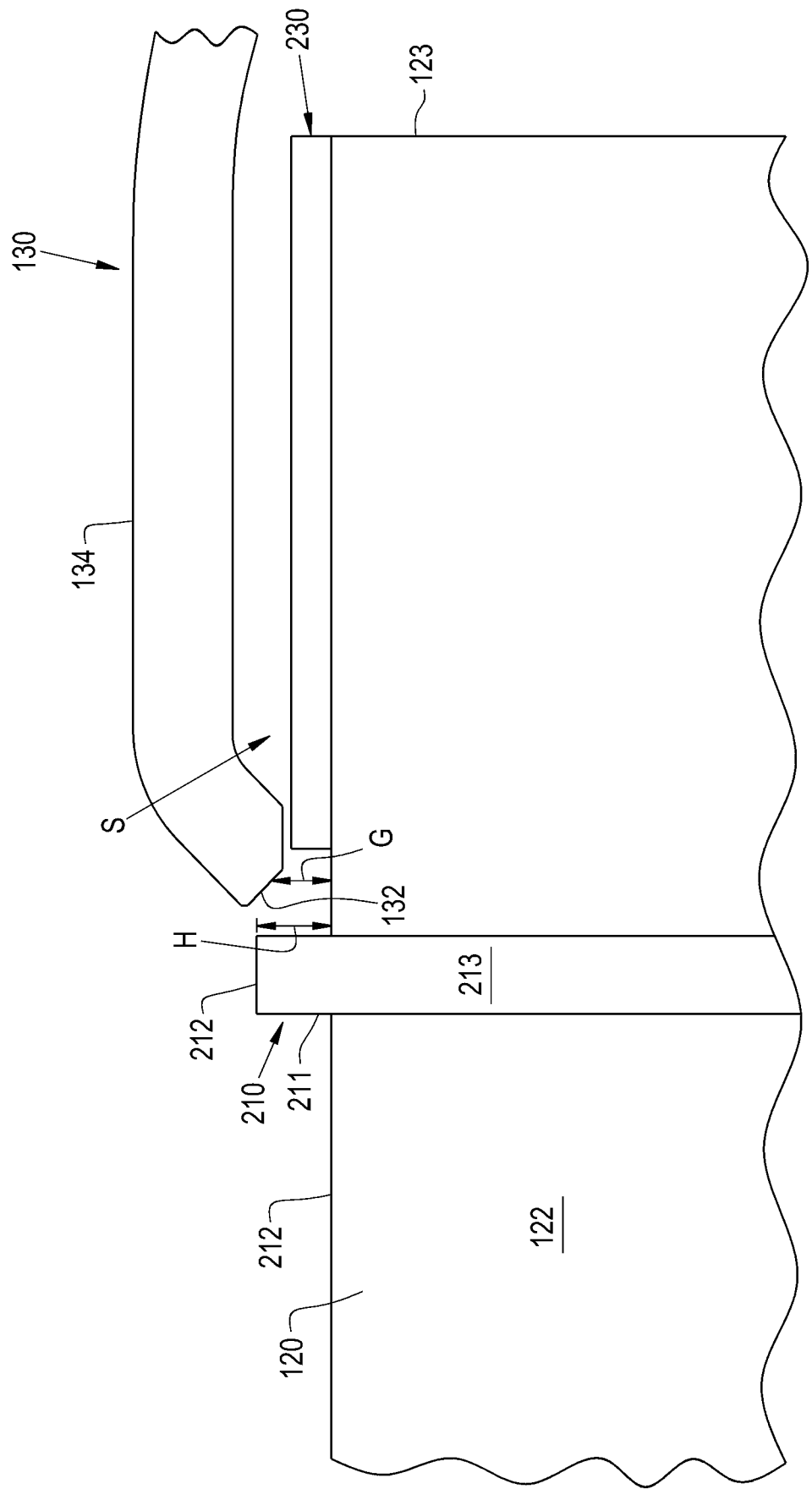
FIG. 4 illustrates an end view of one of the draper belts of the header of FIGS. 1-3.

Referring still to FIGS. 2-3, it is illustrated in greater detail that the header 100 includes a seed saver 210 that is associated with the draper belt 120. While only one of the draper belts 120 is illustrated in FIGS. 2-3 with an associated seed saver 210, it should be appreciated that a seed saver 210 may be associated with each of the draper belts 120 according to the present disclosure. It should be further appreciated that while the element 210 is referred to herein as a "seed" saver, the element 210 can be configured to save crop material other than seeds, including but not limited to soybeans. The seed saver 210 defines a length L, i.e., a greatest dimension, that extends in the travel direction T of the draper belt 120. In other words, the greatest dimension (the length L) of the seed saver 210 extends in the travel direction T. In some embodiments, the length L of the seed saver 210 extends generally parallel to the travel direction T, i.e., a line drawn through the length L of the seed saver 210 defines an angle of no more than 3° relative to the travel direction T. Referring now to FIG. 4 as well, it is illustrated that the seed saver 210 extends above the draper belt 120 so the seed saver 210 can prevent crop material, such as canola seeds or soybeans, from sliding off the draper belt 120 as the draper belt 120 carries crop material in the travel direction T.

Many known agricultural harvesters with draper headers include crop ramps to direct cut crop material onto the draper belts. While the crop ramps are effective to direct crop material onto the belts, certain issues have been observed. One issue that has been found is that crop material, such as canola seeds and soybeans, can slide off the draper belt during conveyance toward the center and reduce the crop yield. To prevent crop material from sliding off the draper belt, one or more seed savers may be provided adjacent to the front of the draper belt and that act as a stop for the crop material. Such a seed saver(s) is generally placed close to the front edge of the draper belt so the rear edge of the crop ramp(s) is rearwardly of the seed saver(s). It has been found that such configurations can have increased power requirements compared to configurations that do not have a seed saver. It has been further found that the region between the seed saver, the draper belt, and the crop ramp can harbor accumulated debris, such as dirt. If the debris accumulates to a sufficient degree under the crop ramp, the debris can be a significant source of friction for the draper belt, requiring more power to move the draper belt while also increasing wear on the draper belt.

To address some of the issues with known headers, and referring still to FIGS. 2-4, the seed saver 210 is disposed rearwardly of the rear edge 132 of the crop ramp 130. Since the seed saver 210 is disposed rearwardly of the rear edge 132 of the crop ramp 130, which overlaps the draper belt 120, the seed saver 210 is in a position where the seed saver 210 can prevent crop material from sliding off the draper belt 120 as the draper belt 120 travels in the travel direction T. Further, when a gap G is defined between the rear edge 132 of the crop ramp 130 and the draper belt 120 as illustrated, disposing the seed saver 210 rearwardly of the rear edge 132 of the crop ramp 130 also allows the seed saver 210 to reduce debris accumulation in the space S between the crop ramp 130 and the draper belt 120. It should be appreciated that, in some embodiments, an entirety of the crop ramp 130 does not contact the draper belt 120, which increases the size of the space S where debris can accumulate. Rather than accumulating in the space S between the crop ramp 130 and the draper belt 120, the debris will tend to loosely accumulate at a rear 211 of the seed saver 210, which is not overlapped with elements that may push the accumulated debris into the draper belt 120 and produce friction and the corresponding wear on the draper belt 120. Thus, disposing the seed saver 210 rearwardly of the rear edge 132 of the crop ramp 130 can reduce friction on the draper belt 120, which reduces the wear experienced by the draper belt 120 and also reduces the power needed to cause the draper belt 120 to travel in the travel direction T.

As illustrated, the seed saver 210 may have a shape defining a rectangular cross-section with perpendicular corners, but it should be appreciated that the seed saver 210 may have a shape defining a different cross-section, e.g., square, circular, or oval. A top 212 of the seed saver 210 may define a height H relative to the draper belt 120, i.e., relative to a conveying surface 121 of the draper belt 120. The height H may be, for example, between 6 mm and 8 mm. As illustrated in FIG. 4, the seed saver 210 may be disposed so lateral edges 213 of the seed saver 210 extend past corresponding lateral ends 122 of the draper belt 120. In this respect, the draper belt 120 may be disposed between the opposite lateral edges 213 of the seed saver 210. The seed saver 210 may, for example, be molded into and attached to the draper belt 120.

While the seed saver 210 is effective to reduce the amount of debris accumulating under the crop ramps 130, there is still a possibility that debris will be forced over the top 212 of the seed saver 210 and accumulate under one or more of the crop ramps 130. To further reduce the detrimental effects of debris accumulation under the crop ramps 130, in some embodiments the header 100 further includes one or more debris dislodging protrusions 230 that are carried by the draper belt 120. The debris dislodging protrusion(s) 230 is disposed in front of the seed saver 210 so the debris dislodging protrusion(s) 230 overlaps the crop ramp 130. In some embodiments, the debris dislodging protrusion(s) 230 defines a length, i.e., a greatest dimension, that extends generally perpendicular to the travel direction T so the debris dislodging protrusion(s) 230 acts as a sweep to remove debris that has accumulated under the crop ramp 130 as the draper belt 120 carries the debris dislodging protrusion(s) 230. The debris dislodging protrusion(s) 230 may extend, for example, to a front edge 123 of the draper belt 120 in order to sweep a larger area under the crop ramps 130. In some embodiments, a plurality of spaced apart debris dislodging protrusions 230 overlap each crop ramp 130 so the area under the crop ramps 130 is constantly swept of debris. When there are a plurality of debris dislodging protrusions 230, the debris dislodging protrusions 230 may each define a same clearance relative to the bottom of the crop ramps 130 or, alternatively, may define different clearances relative to the bottom of the crop ramps 130. The debris dislodging protrusion(s) 230 may define a similar height, relative to the draper belt 120, that the seed saver 210 does or, alternatively, define a larger or smaller height. It should thus be appreciated that the combination of the seed saver 210 with the debris dislodging protrusion(s) 230 acts to reduce the amount of debris that is put in a position to accumulate under the crop ramps 130 and also to sweep away accumulated debris from under the crop ramps 130, reducing the risk of operation of the draper belt 120 being detrimentally affected by accumulated debris.

From the foregoing, it should be appreciated that the header 100 provided according to the present disclosure is less prone to wear and increased power consumption that arises due to debris accumulating under the crop ramps 130. The seed saver 210 can prevent debris from accumulating under the crop ramps 130 in the first place while the debris dislodging protrusion(s) 230 can sweep away any debris that does accumulate. Thus, wear on the draper belt 120 can be reduced and the power requirements to move the draper belt 120 can be reduced by decreasing, if not mostly eliminating, the friction exerted on the draper belt 120 by accumulated debris.

These and other advantages of the present invention will be apparent to those skilled in the art from the foregoing specification. Accordingly, it is to be recognized by those skilled in the art that changes or modifications may be made to the above-described embodiments without departing from the broad inventive concepts of the invention. It is to be understood that this invention is not limited to the particular embodiments described herein, but is intended to include all changes and modifications that are within the scope and spirit of the invention.

What is claimed is:

1. A header for an agricultural harvester, comprising:
   a header frame;
   a plurality of cutters carried by the header frame and configured to cut crop material;
   a draper belt carried by the header frame rearwardly of the cutters and configured to travel in a travel direction;
   at least one crop ramp associated with at least one of the cutters, the at least one crop ramp comprising a front edge disposed in front of the draper belt and a rear edge that Overlaps the draper belt;
   a seed saver that is associated with the draper belt and defines a length extending in the travel direction, the seed saver extending above the draper belt and being disposed rearwardly of the rear edge of the at least one crop ramp; and
   at least one debris dislodging protrusion carried by the draper belt, disposed in front of the seed saver, and overlapping the at least one crop ramp.

2. The header of claim 1, wherein the length of the seed saver extends generally in parallel with the travel direction of the draper belt.

3. The header of claim 1, wherein a top of the seed saver defines a height relative to the draper belt, the height being between 6 mm and 8 mm.

4. The header of claim 1, wherein the rear edge of the at least one crop ramp and the draper belt define a gap therebetween.

5. The header of claim 4, wherein an entirety of the at least one crop ramp does not contact the draper belt.

6. The header of claim 1, wherein the at least one debris dislodging protrusion defines a length extending generally perpendicular to the travel direction.

7. The header of claim 1, wherein a plurality of debris dislodging protrusions overlap the at least one crop ramp.

8. An agricultural harvester, comprising:
a chassis; and
a header carried by the chassis, the header comprising:
  a header frame;
  a plurality of cutters carried by the header frame and configured to sever crop material;
  a draper belt carried by the header frame rearwardly of the cutters and configured to travel in a travel direction;
  at least one crop ramp associated with at least one of the cutters, the at least one crop ramp comprising a front edge disposed in front of the draper belt and a rear edge that overlaps the draper belt;
  a seed saver that is associated with the draper belt and defines a length extending in the travel direction, the seed saver extending above the draper belt and being disposed rearwardly of the rear edge of the at least one crop ramp; and
  at least one debris dislodging protrusion carried by the draper belt, disposed in front of the seed saver, and overlapping the at least one crop ramp.

9. The agricultural harvester of claim 8, wherein the length of the seed saver extends generally in parallel with the travel direction of the draper belt.

10. The agricultural harvester of claim 8, wherein a top of the seed saver defines a height relative to the draper belt, the height being between 6 mm and 8 mm.

11. The agricultural harvester of claim 8, wherein the rear edge of the at least one crop ramp and the draper belt define a gap therebetween.

12. The agricultural harvester of claim 11, wherein an entirety of the at least one crop ramp does not contact the draper belt.

13. The agricultural harvester of claim 8, wherein the at least one debris dislodging protrusion defines a length extending generally perpendicular to the travel direction.

14. The agricultural harvester of claim 8, wherein a plurality of debris dislodging protrusions overlap the at least one crop ramp.

* * * * *